United States Patent [19]

Lord

[11] Patent Number: 5,090,758
[45] Date of Patent: Feb. 25, 1992

[54] RIGID SPINE INFLATABLE END EFFECTOR

[76] Inventor: Carter K. Lord, 2433 N. Perry Park Rd., Sedalia, Colo. 80135

[21] Appl. No.: 433,856

[22] Filed: Nov. 9, 1989

[51] Int. Cl.$^5$ .......................... B25J 15/00; B66C 1/00
[52] U.S. Cl. ................... 294/98.1; 294/119.3; 901/31
[58] Field of Search ............... 294/63.2, 90, 93, 98.1, 294/99.1, 119.3, 902; 244/158 R, 161; 269/22; 279/2 A; 285/97; 403/5; 414/729, 735, 738; 901/30, 31, 36, 37, 39

[56] References Cited

U.S. PATENT DOCUMENTS

| | | | |
|---|---|---|---|
| 2,741,381 | 4/1956 | Bezien | 294/98.1 X |
| 3,574,386 | 4/1971 | Frost | 294/98.1 X |
| 3,741,409 | 6/1973 | Painter | 294/98.1 X |
| 3,831,995 | 8/1974 | Duncan | 294/119.3 |
| 4,253,694 | 3/1981 | Walter et al. | 294/98.1 |
| 4,273,505 | 6/1981 | Clark et al. | 294/98.1 X |
| 4,783,108 | 11/1988 | Fukuyama et al. | 294/98.1 |

FOREIGN PATENT DOCUMENTS

| | | | |
|---|---|---|---|
| 2814915 | 10/1978 | Fed. Rep. of Germany | 294/119.3 |
| 2845094 | 5/1980 | Fed. Rep. of Germany | 294/98.1 |
| 2568161 | 1/1986 | France | 294/98.1 |
| 234407 | 4/1986 | German Democratic Rep. | 294/98.1 |
| 1382806 | 3/1988 | U.S.S.R. | 294/98.1 |
| 1418265 | 8/1988 | U.S.S.R. | 294/98.1 |

Primary Examiner—Johnny D. Cherry
Attorney, Agent, or Firm—Donald W. Margolis

[57] ABSTRACT

This invention relates to an end effector device for robotic or teleoperated type systems for remotely handling various items which includes an inflatable bladder surrounding a rigid cylindrical spine either on its outer surface for grasping the inner bore of deep holes, or on the inner surface of a rigid cylindrical spine for grasping the outer surface of cylindrical objects. The device may be inserted into a hole or natural bore of an item, or, in the configuration having the bladder on the inner surface of the rigid cylindrical spine, may be placed over a cylindrical item or portion of an item to be manipulated by the robotic or teleoperated system. Application of pressure to an inflating fluid inflates the bladder, grasping the item securely with a uniform force. The item is released by releasing the pressure within the bladder, causing it to contract.

5 Claims, 2 Drawing Sheets

RIGID SPINE INFLATABLE END EFFECTOR

ORIGIN OF THE INVENTION

The invention described herein was made by the inventor while working on developmental research in the field of handling fragile composite structural components for assembly of various structures in space, more specifically, while developing an inflatable end effector system based on U.S. Pat. No. 4,273,505. During the engineering development and testing of that device, the invention described herein was conceived and subsequently brought to the current level of definition.

BACKGROUND OF THE INVENTION

The invention relates to a device for grasping an object from a remote location and, more particularly, to an end effector device for the end of a remotely controlled mechanical manipulator arm of the type used in robotic manufacturing and assembly operations and various space exploration programs whereby an object may be grasped by insertion of the device into an open part of the object or, in another but similar configuration of the device, by insertion of a long cylindrical part of the object into the device.

Prior devices have been developed for grasping objects and performing general work in these applications which have typically included a set of opposed jaws or fingers which are movable towards and away from each other such as shown in U.S. Pat. No. 3,268,091. These devices apply considerable point-contact loads to an object, however, and with the increasing use of fragile thin frame and composite structures, these jaw-type end effectors cannot be utilized without substantial risk of damage to the object being handled or must be equipped with complex sensors to limit the loads applied to the object.

It has also been known to pick up articles having an opening such as bottles with inflatable devices. However, these devices do not readily lend themselves to the structures and problems involved in space applications.

A pneumatic inflatable end effector, U.S. Pat. No. 4,273,508, has been designed to handle thin frame structures in space by utilizing a balloon stretched over a telescoping central tube. While similar in nature, this system lacks the rigidity and locational repeatability required for many robotic and teleoperated handling operations, is of a more complex mechanical nature, and is inherently more fragile than the device described herein.

Of importance to note also is that while prior inflatable grasping devices grasp objects by being placed within an opening in the object, one embodiment of the device described herein has the capability of grasping the outer surface of an object, efficiently handling such items as rods, pins, and other long slender objects which do not have an opening.

SUMMARY OF THE INVENTION

It has been found that an end effector device for a remote controlled manipulator arm of a robotic or teleoperated object handling system can be provided for grasping a variety of objects, including objects of a fragile nature, avoiding damage thereto wherein the device includes a pneumatic inflatable bladder supported by a rigid fixed spine member affording reinforcement for movement in the pitch, yaw, and roll directions while maintaining the device in a grasping configuration.

An important object of this invention is to provide an end effector device which will grasp or hold a variety of objects, including fragile objects such as composite structures or structural components, serviceable satellite repair modules, delicate antenna or solar array components, and the like by providing a uniform, predictable grasping force over a relatively large surface area.

Another important object of the present invention is to provide an inflatable end effector device with no moving parts except for the expansion and contraction of the inflatable bladder thereby virtually eliminating failure or breakdown of the device resulting from component friction and wear.

Another important object of the present invention is to provide an inflatable end effector device which can be used to handle a variety of objects when such objects are provided with a non-complex handling point consisting of a simple deep hole. This represents a considerable improvement in the cost effectiveness of robotic or teleoperated assembly of large complex structures where a large number of structural components each require a dedicated handling point in order to effect the assembly operation.

Another important object of the present invention is to provide an inflatable end effector device which can grasp the outer surface of a relatively long slender protrusion from an object such as an antenna stub, clevis pin, or any number of other rod type protrusions from an object, or objects whose configuration is similar to the above mentioned protrusions.

Another important object of the present invention is to provide an inflatable end effector device which can be used to handle a variety of objects when such objects are provided with a non-complex handling point consisting of a simple protruding cylindrical rod. This represents a considerable improvement in the cost effectiveness of robotic or teleoperated assembly of large complex structures where a large number of structural components each require a dedicated handling point in order to effect the assembly operation.

Another important object of the present invention is to provide an inflatable end effector device which will fit a range of object opening shapes and sizes.

Another important object of the present ivnention is to provide an inflatable end effector device which will fit a range of object protrusion shapes and sizes.

Another important object of the present invention is to provide an inflatable end effector device which is easily modified for handling objects having shallower openings or shorter protrusions by the attachment of a simple sleeve or cylindrical limiting adaptor respectively to the basic device.

Another important object of the present invention is to provide an inflatable end effector device which is inherently compliant and highly forgiving when placed under strain by the object being grasped or held, thereby minimizing the loads imparted to the robotic or teleoperated manipulator system.

Another important object of the present invention is to provide an inflatable end effector device which is inherently compliant and therefore permits greater locational tolerances to be utilized when assembling objects.

Another important object of the present invention is to provide an inflatable end effector device which is automatically self centering such that it can be inserted into an opening at an angle and will generally assume the shape of the opening once it is inflated, eliminating the need for precise alignment with the opening.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
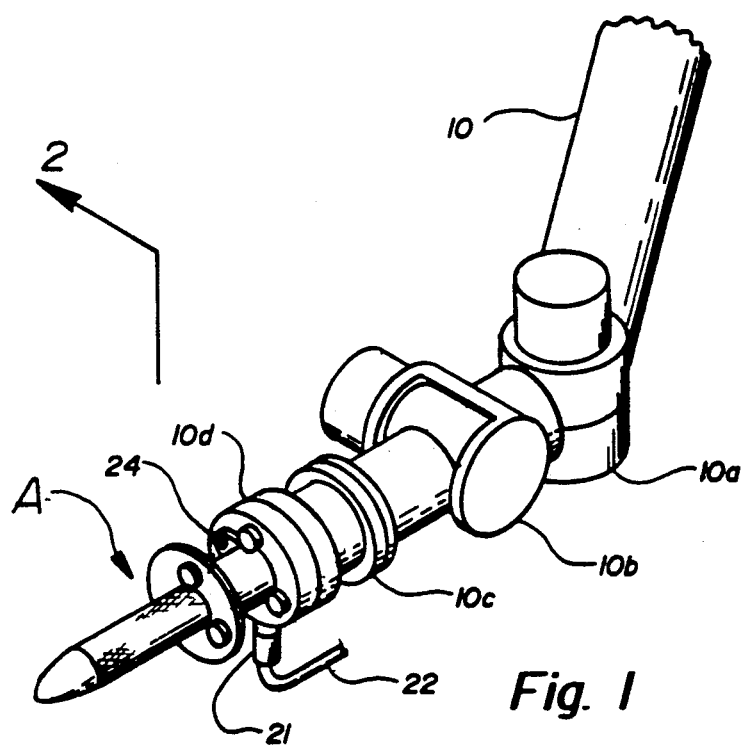
FIG. 1 is a perspective view illustrating a portion of a representative robotic or teleoperated manipulator arm incorporating a rigid spine end effector device constructed according to the internal grasping configuration of the invention for grasping objects utilizing the internal surfaces of holes or openings in the object.

A rigid spine inflatable end effector device, designated generally as A, in FIG. 1, is illustrated in connection with a portion of a representative robotic or teleoperated manipulator arm 10 which includes a plurality of mechanical joints 10a, 10b, and 10c which produce pitch, yaw, and roll rotational motion to position the end effector device as required. Since the details of the manipulator arm and control therefor form no part of the invention herein, such are omitted.

Figure 3:
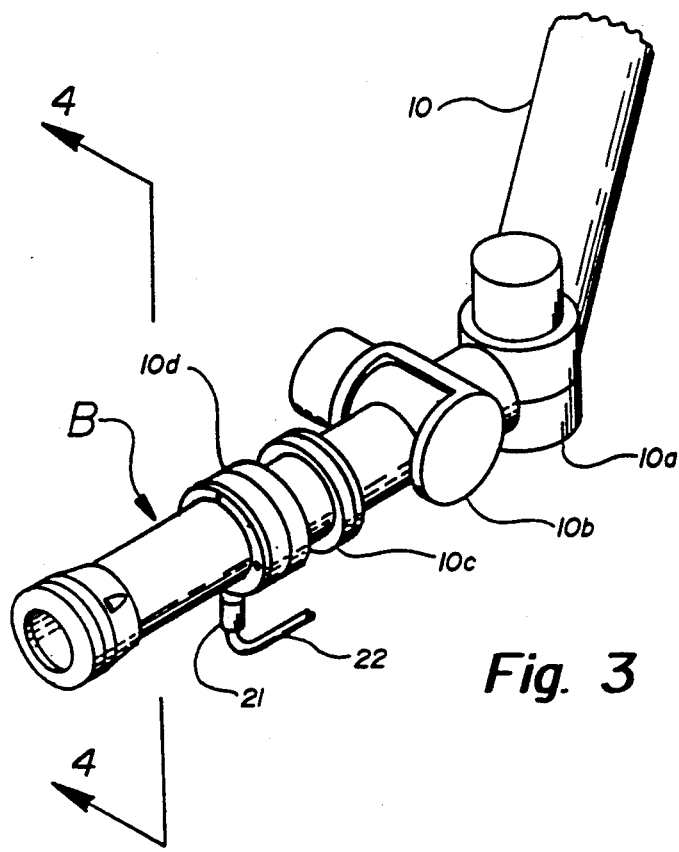
FIG. 3 is a perspective view illustrating a portion of a representative robotic or teleoperated manipulator arm incorporating a rigid spine end effector device constructed according to the external grasping configuration of the invention for grasping objects utilizing the outer surfaces of long slender protrusions on the object or the outer surface of long cylindrical objects.

Similarly, a rigid spine inflatable end effector device, designated generally as B, in FIG. 3, is illustrated in connection with a portion of a representative robotic or teleoperated manipulator arm 10 which includes a plurality of mechanical joints 10a, 10b, and 10c which produce pitch, yaw, and roll rotational motion to position the end effector device as required. Since the details of the manipulator arm and control therefor form no part of the invention herein, such are omitted.

Figure 2:
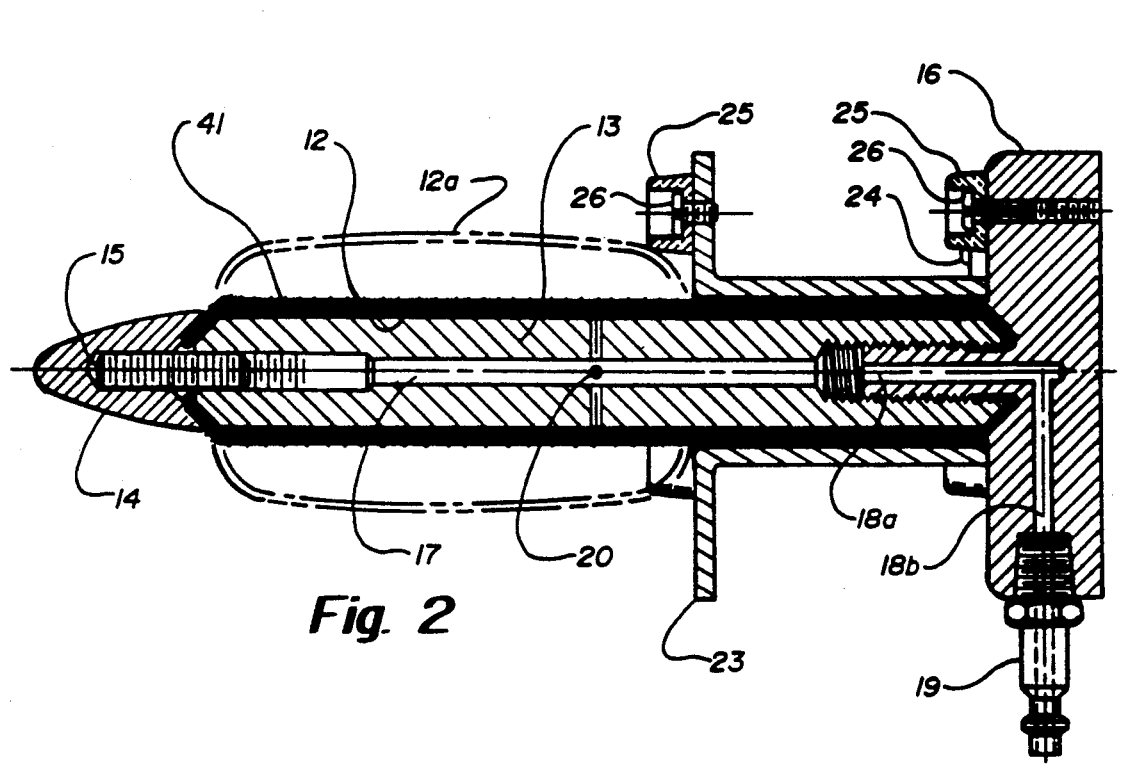
FIG. 2 is a section view of the invention illustrating the internal configuration and features of the internal grasping configuration of the invention and including an uninflated bladder, but showing, in phantom, such a bladder in its inflated configuration.

Referring now in more detail to FIG. 1 and FIG. 2, the rigid spine inflatable end effector A is illustrated as including a bladder 12 contained on a rigid central spine 13 by means of an internally threaded nose cone 14 and threaded stud 15 on the forward end of the rigid central spine 13 and by the base 16 on the aft end of the rigid central spine 13. The action of assembling the rigid central spine 13 to the base 16 and the nose cone 14 to the rigid central spine 13 effectively secures the bladder 12 in place and also provides a pneumatic seal at both ends of the bladder 12. The base 16 may be connected to the manipulator arm 10 at the manipulator arm/end effector interface 10d by means of conventional screws, bolts or other fastening devices, or may be mated to specialized attachment systems characteristic of the particular manipulator arm. The bladder 12 may be provided by any suitable inflatable fabric or elastic-type material, and may be protected from abrasion or wear by any number of means 41 such as braided wire or fabric coverings or other types of surface protection.

The rigid spine end effector device A includes a bore 17 in the rigid central spine 13 and another bore 18a and 18b in the base 16 for communicating a suitable pneumatic fluid from a coupling 19 through bores 18a, 18b, 17, and a plurality of holes 20 in the rigid central spine 13 to the interior of the bladder 12. The coupling 19 is connected to a suitable pressurized fluid source (not shown) and any conventional controls provided for the admission and venting of the pneumatic fluid by means of a mating coupling 21 and flexible tubing 22.

Any suitable source of pressurized fluid such as air, nitrogen gas, water (in the case of underwater applications), or oil may be utilized. It is preferred that the pressurizing system be a closed system so that in applications in space or underwater, no expulsion of the pressurized fluid occurs resulting in a reactionary movement, and for general efficiency in other applications.

For the purpose of modifying the effective length of the rigid spine end effector device A, an adaptor 23 can be installed over the bladder 12 and attached to the base 16 by a screw 24. The adaptor 23, when installed as shown, effectively prohibits the bladder 12 from inflating in the area of the adaptor 23 and permits the grasping of objects utilizing holes or openings shallower than the entire length of the device without the adaptor 23 installed. When installed, the adaptor 23 provides for an expansion of the bladder 12 of a configuration generally depicted by 12a.

A plurality of protective resilient bumpers 25 are attached to the base 16 and the forward facing surface of the adaptor 23 by means of a single screw 26 centrally located in each protective relilient bumper 25 to provide a measure of damage protection in the event the rigid spine end effector device A is inadvertently inserted into a hole or opening in an object too deeply.

Figure 4:
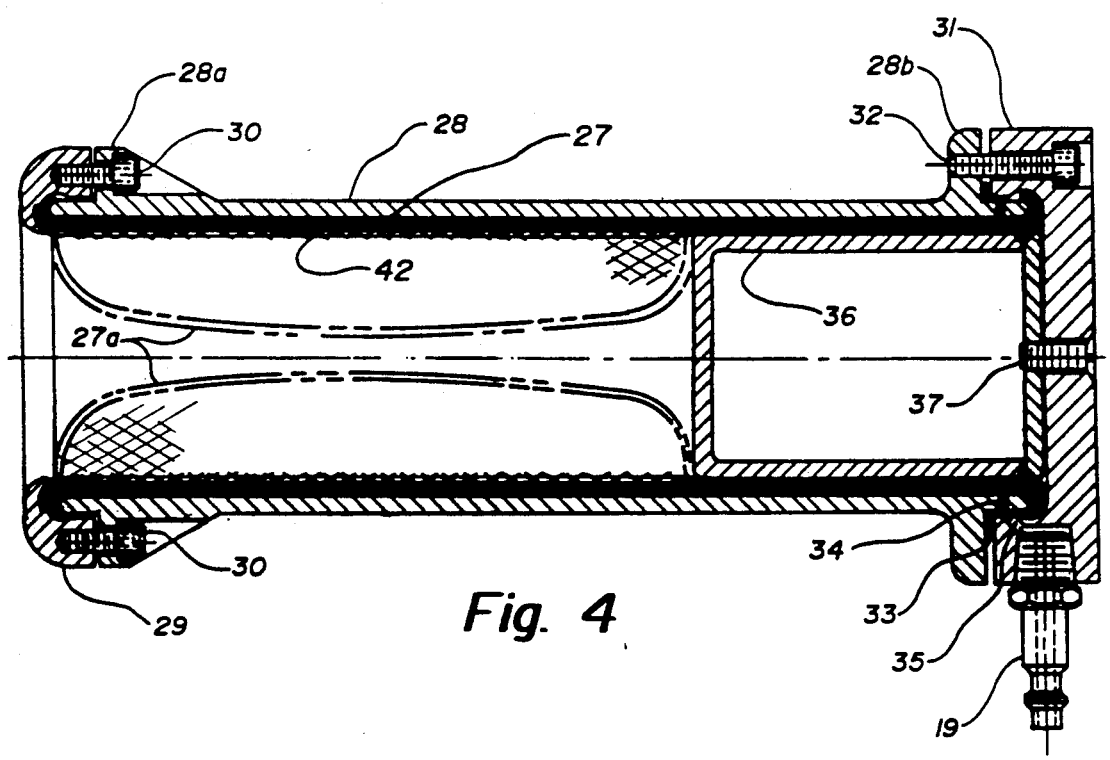
FIG. 4 is an enlarged section view, taken along lines 4—4 of FIG. 3, and of the invention illustrating the internal configuration and features of the external grasping configuration of the invention.

Referring now in more detail to FIG. 3 and FIG. 4, the rigid spine inflatable end effector B is illustrated as including a bladder 27 contained within a rigid tubular central spine 28 by means of a nose cap 29 which is attached to the rigid tubular central spine 28 by means of a plurality of machine screws 30 which secure the nose cap 29 to a flange 28a on the forward end of the rigid tubular central spine 28 and by the base 31 on the aft end of the rigid tubular central spine 28. The base 31 is attached to the rigid tubular central spine 28 by means of a plurality of machine screws 32 which secure the base 31 to a flange 28b near the aft end of the rigid tubular central spine 28. The action of assembling the rigid tubular central spine 28 to the base 31 and the nose cap 29 to the rigid tubular central spine 28 effectively secures the bladder 27 in place and, in conjunction with a resilient annular ring seal 33 placed between the base 31 and the flange 28b, also provides a pneumatic seal at both ends of the bladder 12. The base 31 may be connected to the manipulator arm 10 at the manipulator arm/end effector interface 10d by means of conventional screws, bolts or other fastening devices, or may be mated to specialized attachment systems characteristic of the particular manipulator arm. The bladder 27 may be provided by any suitable inflatable fabric or elastic-type material, and may be protected from abrasion or wear by any number of means 43 such as braided wire or fabric coverings or other types of surface protection.

The rigid spine end effector device B includes a plurality of holes 34 in the rigid tubular central spine 28 and another hole 35 in the base 31 for communicating a suitable pneumatic fluid from a coupling 19 through hole 35, into the area between the rigid tubular central spine 28 and the base 31 and through the plurality of holes 34 to the interior of the bladder 27. The coupling 19 is connected to a suitable pressurized fluid source (not shown) and any conventional controls provided for the admission and venting of the pneumatic fluid by means of a mating coupling 21 and flexible tubing 22.

Any suitable source of pressurized fluid such as air, nitrogen gas, water (in the case of underwater applications), or oil may be utilized. It is preferred that the pressurizing system be a closed system so that in applications in space or underwater, no expulsion of the pressurized fluid occurs resulting in a reactionary movement, and for general efficiency in other applications.

For the purpose of modifying the effective length of the rigid spine end effector device B, an adaptor 36 can be installed into the bladder 27 and attached to the base 31 by a screw 37. The adaptor 36, when installed as shown, effectively prohibits the bladder 27 from inflating in the area of the adaptor 36 and permits the grasping of objects utilizing protrusions shorter than the entire depth of the bore of the rigid spine inflatable end effector device B without the adaptor 36 installed. When installed, the adaptor 36 provides for an expansion of the bladder 27 of a configuration generally depicted by 27a.

In operation, the rigid spine end effector A is inserted into a deep hole or opening in the object to be grasped or handled by manipulating the manipulator arm 10. It is not necessary that the rigid spine end effector A be inserted in any precise alignment with the hole or opening, as the alignment will be established upon inflation of the bladder 12. Once the bladder 12 is inflated to the specified pressure for handling that particular object, the object may be moved, repositioned, or otherwise manipulated by the manipulator arm 10 in conjunction with the rigid spine inflatable end effector A. Any force of the rigid spine inflatable end effector A against the object being handled will be partially absorbed by the resiliency of the bladder 12 which is somewhat yielding and forgiving, and will therefore tend to minimize the effect of that force on the object.

In operation, the rigid spine end effector B is positioned over or around a long slender protrusion on the object to be grasped or handled or is positioned so as to enclose all or a portion of the outer surface of a long cylindrical object to be grasped or handled by manipulating the manipulator arm 10. It is not necessary that the rigid spine end effector A be inserted in any precise alignment with the protrusion or surface to be grasped, as the alignment will be established upon inflation of the bladder 27. Once the bladder 27 is inflated to the specified pressure for handling that particular object, the object may be moved, repositioned, or otherwise manipulated by the manipulator arm 10 in conjunction with the rigid spine inflatable end effector B. Any force of the rigid spine inflatable end effector B against the object being handled will be partially absorbed by the resiliency of the bladder 27 which is somewhat yielding and forgiving, and will therefore tend to minimize the effect of that force on the object.

Thus, it can be seen that an advantageous construction can be had for an end effector for manipulative devices for many applications, including space, defense, and industrial uses, which provides a means for capturing, holding, handling, and maneuvering objects of various sizes and shapes such as satellites, payloads, structural members, modular components and the like. Particularly, fragile composite structural components or delicate satellite repair modules may be effectively handled with a positive gripping force without risk of damage which often accompanies the use of conventional end effector arrangements such as jaws, which are not reliably effective in avoiding the crushing and damage of these fragile structures. Further, the limited flexibility of the rigid spine end effector device permits all the features identified above while permitting positional repeatability of the objects being handled due to the rigid spine and its ability to maintain a smaller positional variation between the object being handled and the end effector than have previous inflatable end effector systems.

While a preferred embodiment of the invention has been described using specific terms, such description is for illustrative purposes only, and it is to be understood that changes and variations may be made without departing from the spirit or scope of the following claims.

What is claimed is:

1. In the combination of a manipulator arm and an end effector device for carrying out maneuvers by utilizing said end effector device to grasp an object to be handled, wherein said end effector device comprises:

a rigid central spine, said rigid central spine having a forward end, an aft end, and an outer cylindrical surface;

an inflatable bladder surrounding and substantially adjacent said outer cylindrical surface of said rigid central spine, said inflatable bladder having a forward end and an aft end;

means for attaching said forward end of said inflatable bladder to said forward end of said rigid central spine to form a sealed bladder-to-spine junction therebetween;

means for attaching the aft end of said inflatable bladder to the aft end of said rigid central spine to form a sealed bladder-to-spine junction therebetween;

a base for holding said rigid central spine, said base including a forward surface, and being adapted for attachment to a manipulator arm to form a spine-to-base junction;

means for sealing said spine-to-base junction to prevent the passage or leakage of gases or liquids;

means for connecting a source of pressurized fluid to said base;

at least one opening in said base to communicate said pressurized fluid to a surface on said rigid central spine opposite the surface surrounded by said bladder;

at least one opening between the surface of said rigid central spine opposite the surface surrounded by said bladder and the area between said rigid central spine and said inflatable bladder to permit said pressurized fluid to pass between said source of pressurized fluid and the area between said rigid central spine and said inflatable bladder; and an adapter attached to said base, said adapter having a forward surface which carries a plurality of resilient protective bumpers, said adaptor being positioned and located to fit over said inflatable bladder, and said protective bumpers being positioned and located to fit around said inflatable bladder, whereby the inflation of said inflatable bladder is restricted over a portion of its length.

2. The device of claim 1 wherein said adaptor is secured to said forward surface of said base.

3. The device of claim 1 which includes a means for protecting said external surface of said bladder from damage.

4. The device of claim 3 wherein said means for protecting said external surface of said bladder from damage is a covering.

5. The device of claim 1 which includes an end effector device cone connected to the forward end of said rigid spine for use in guiding said end effector device into an opening.

* * * * *